United States Patent [19]

Toyota

[11] Patent Number: 4,858,021

[45] Date of Patent: Aug. 15, 1989

[54] ELECTRONIC BLACKBOARD CAPABLE OF PROVIDING HARDCOPY

[75] Inventor: Takehito Toyota, Kamakura, Japan

[73] Assignee: Mitsubishi Denki Kabushiki Kaisha, Tokyo, Japan

[21] Appl. No.: 212,712

[22] Filed: Jun. 28, 1988

Related U.S. Application Data

[63] Continuation of Ser. No. 18,826, Feb. 24, 1987, Pat. No. 4,755,882, which is a continuation of Ser. No. 780,564, Sep. 26, 1985, abandoned.

[30] Foreign Application Priority Data

Sep. 27, 1984 [JP]  Japan ................................ 59-202620

[51] Int. Cl.4 .............................................. H04N 1/10
[52] U.S. Cl. .................................................... 358/494
[58] Field of Search ............... 358/293, 294, 286, 280, 358/285

[56] References Cited

U.S. PATENT DOCUMENTS

| | | | |
|---|---|---|---|
| 4,429,333 | 1/1984 | Davis et al. | 358/293 |
| 4,587,568 | 5/1986 | Takayama et al. | 358/293 |
| 4,609,946 | 9/1986 | Thaler | 358/293 |
| 4,725,889 | 2/1988 | Yaniv | 358/285 |

FOREIGN PATENT DOCUMENTS

176767 11/1982 Japan .

*Primary Examiner*—Edward L. Coles, Sr.
*Attorney, Agent, or Firm*—Wolf, Greenfield & Sacks

[57] ABSTRACT

An electronic blackboard system for providing hardcopy of information written on a blackboard. A photoelectric device is supported from a horizontally disposed guide rail which in turn is supported from the blackboard. A drive motor and roller mounted on the photoelectric device drive the device by direct contact of the roller with the blackboard surface.

16 Claims, 4 Drawing Sheets

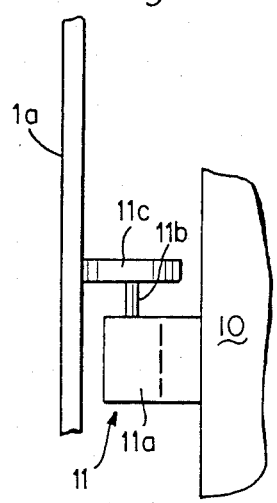

ELECTRONIC BLACKBOARD CAPABLE OF PROVIDING HARDCOPY

This application is a continuation of application Ser. No. 07/018,826, filed Feb. 24, 1987, now U.S. Pat. No. 4,755,882 which in turn is a continuation of application Ser. No. 06/780,564, filed Sept. 26, 1985, now abandoned.

BACKGROUND OF THE INVENTION

1. Field of the Invention

This invention relates to an electronic blackboard system capable of making hardcopy of information written on the blackboard.

2. Description of the Prior Art

In recent years, various kinds of equipment have been developed in the rapid progress of office automation. One such piece of equipment is an electronic blackboard in which information written with an implement for drawing, such as a felt-tip pen or the like, on the black surface of a flexible sheet attached to the blackboard body during a conference or meeting is read out through an image sensor or an image pickup device constructed of CCD (Charge Coupled Device) as the flexible sheet is wound up at a constant rate. The readout information may be recorded by a printer and kept in the form of hardcopy.

Referring to FIGS. 1 and 2, there are shown front and plan views, respectively, of a typical arrangement of a prior electronic blackboard. In the drawings, reference number 1 denotes a flexible sheet on which information can be written, which may be moved and rolled in a manner similar to film in a camera; number 2 designates a fluorescent lamp uniformly illuminating the surface of the sheet 1 along the longitudinal direction of the lamp; number 3 denotes a mirror disposed so as to direct the light reflected by the surface of the sheet 1 to a predetermined position; number 4 denotes a lens fixed at a predetermined position; number 5 denotes a CCD image sensor aligned with the lens 4; number 6 denotes a buffer memory storing the image data sensed by the image sensor, number 7 denotes a hardcopying machine such as a printer; and number 8 denotes an apparatus for winding and rewinding the sheet 1.

With such an arrangement, the winding/rewinding apparatus 8 rolls up the sheet 1 at a constant rate in the direction designated by arrow A after some information has been written thereon. As the sheet 1 is rolled up, the fluorescent lamp 2 illuminates the periphery of the rolled sheet 1, and the light reflected therefrom is directed by the mirror 3 to the image pickup device 5 through the lens 4 as shown in FIG. 2. Thus the image of the written information on the sheet 1 is focused onto the CCD image sensor by the lens 4, where the image is converted into a corresponding electrical signal.

It must be noted that the CCD image sensor 5 is a one-dimensional sensing means picking up an optical image as a series of lines. Therefore, the image data of all the information written on the sheet 1 is obtained by scanning each sensing element of the device 5 at a constant rate to pick up a linear image as the sheet is moved at a predetermined rate in the direction denoted by arrow A.

This image data of the information written on the sheet 1 is temporarily stored in the buffer memory 6 and then printed out by the hardcopying machine 7 in the form of hardcopy.

In the aforementioned electronic blackboard system of the prior art, since the sheet on which the information is written must be rolled up in order to read out the information, it is necessary to rewind the sheet when the blackboard is to be used for writing new information thereon. In particular, when the blackboard is used by different people in succession, the sheet must be wound and rewound every time it is used. Consequently, this prior art system is complicated in both its mechanism and its operation.

In addition, the sheet on which the information is written must be flexible because of the necessity of winding and rewinding it, and it is therefore undesirable in that a rigid board cannot be used to write on.

SUMMARY OF THE INVENTION

In view of the foregoing problems associated with the prior art, it is an object of this invention is to provide a novel and improved electronic blackboard whose mechanism is very simple, and in which even a rigid board can be used to write on.

In the accomplishment of this and other objects of the present invention, an electronic blackboard system is provided which includes board means on which information can be written, photoelectric means for picking up a linear optical image of the information written on the board and converting into a corresponding electrical signal, driver means for moving the photoelectric means in the direction perpendicular to the line of the pick-up operation thereof, memory means for storing the image data from the photoelectric means, and hardcopying means for reading out the data stored in the memory means and printing the contents thereof.

In accordance with the present invention, the information written on the board means is linearly sensed by the photoelectric means, and, at the same time, the photoelectric means is moved in the direction perpendicular to the sensing line of the photoelectric means, whereby an image of all the information written on the board is obtained.

With such an arrangement, the mechanism of the electronic blackboard according to the present invention is simpler than that of the prior art, and a rigid board is also used as a means for writing information.

These and other features and advantages of the invention will become apparent to those skilled in the art from the following detailed description of the preferred embodiment, taken together with the accompanying drawings.

BRIEF DESCRIPTION OF THE DRAWINGS

FIG. 7 shows the driver motor and roller arrangement.

DETAILED DESCRIPTION OF PREFERRED EMBODIMENT

Figure 1:
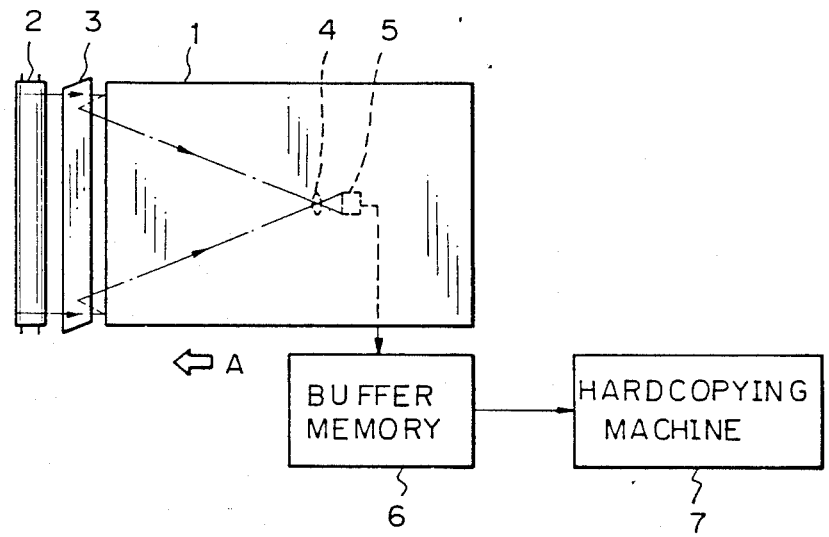
FIGS. 1 and 2 are front and plan views, respectively, of a prior-art electronic blackboard system.
Figure 2:
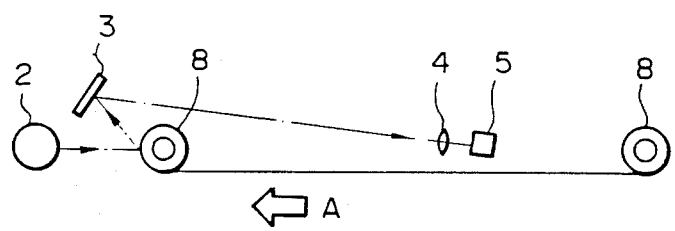
Figure 3:
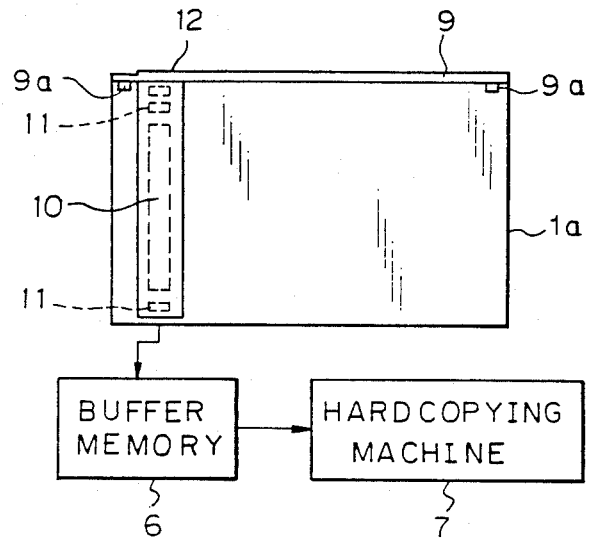
FIGS. 3 and 4 are front and side views, respectively, of an electronic blackboard system according to the present invention.
Figure 4:
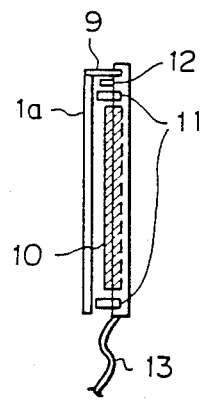

Referring to FIGS. 3 and 4, the principal structure of one embodiment of this invention is shown in front and side views, respectively. In the drawings, reference number 1a denotes a rigid board on which information can be written; numbers 6 and 7 denote a buffer memory and a hardcopying machine, respectively, of conventional types; number 9 denotes a guide rail fixed horizontally to the upper edge of the rigid board 1a; and number 10 denotes a photoelectric device which comprises a longitudinally-extended image pickup device (image sensor), a light-directing device, and light-emitting diodes (LEDs) juxtaposed on both sides of the light-directing device, one end of the photoelectric device being supported by a guide rail 9 in such a way that the photoelectric device is movable along the surface of the rigid board 1a. In addition, reference number 11 denotes drivers which are disposed at both ends of the photoelectric device 10, the drivers being synchronous with each other to move the photoelectric device to the left or the right; number 12 denotes a position detector comprising opposed LEDs or photodetectors for sensing when a strip 9a is therebetween; and number 13 denotes a cable for transmitting power and signals.

Figure 5:
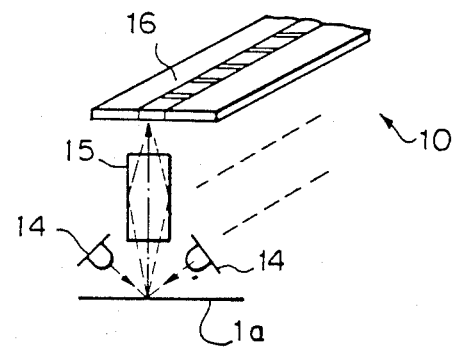
FIG. 5 is an enlarged schematic diagram of the photoelectric device 10.

Referring to FIG. 5, there is shown a detailed configulation of the photoelectric device 10 which includes LEDs 14, a plurality of rod lenses 15 and a CCD image sensor 16. The image sensor is constructed of a plurality of similar elements arranged in succession, as illustrated in FIG. 5. Although the LEDs 14 and the rod lenses 15 are arranged to correspond to the elements, the number of rod lenses is not essentially the same as that of the elements. The LEDs illuminate the surface of the board 1a, the light reflected therefrom is directed by the rod lenses to the image sensor on which an image of the information written on the board is focused. The rod lenses and the image sensor are shown as discrete parts, but these may be integrated.

Figure 6:
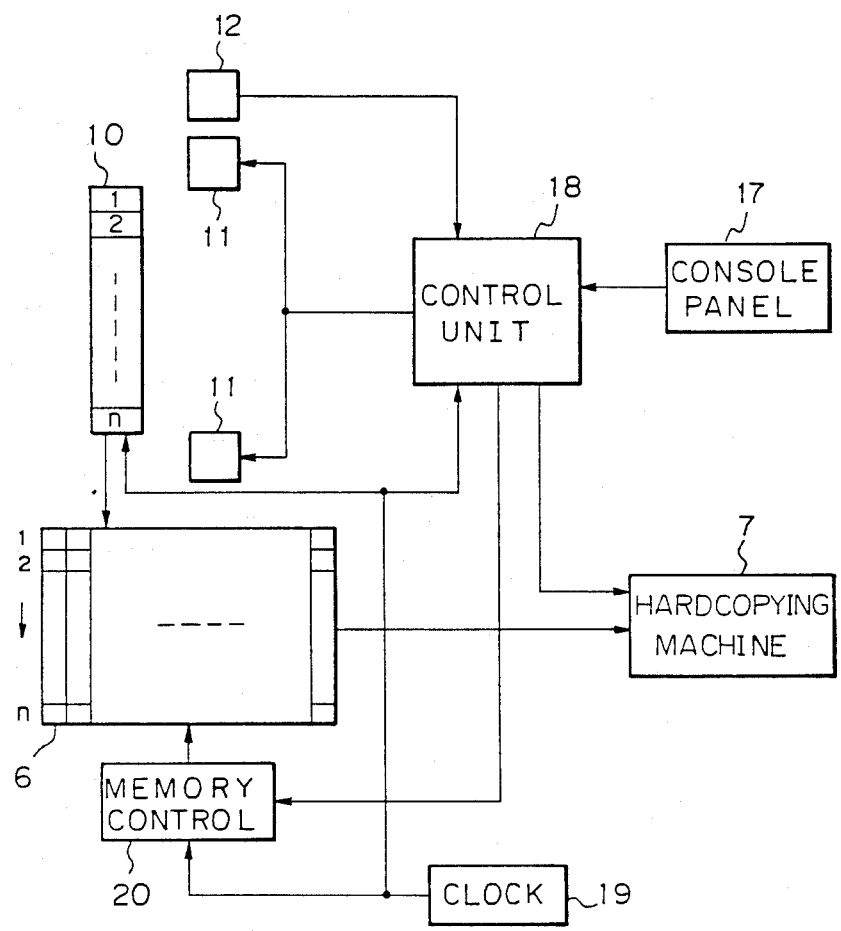
FIG. 6 is a block diagram illustrating an arrangement for controlling the entire operation of the electronic blackboard according to the present invention.

Referring now to FIG. 6, there is shown a block diagram illustrating an arrangement for controlling the entire operation of the electronic blackboard according to the invention. In FIG. 6, reference number 17 denotes a console panel for issuing various commands relating to the operation of this system, the console panel including a switch for triggering the pickup of the image on the board 1 by the photoelectric device 10; number 18 denotes a control unit for controlling the operation of various components; number 19 denotes a clock pulse generator; and number 20 denotes a memory control unit for controlling the operations of writing into the buffer memory 6 and reading out of the buffer memory 6. While the other components are the same as those aforementioned in connection with FIGS. 3 and 4, a laser printer, LED printer, thermal printer, or the like, may be used as the printer 7.

In operation, when a power switch (not shown) is closed, the system is initialized so that the photoelectric device 10 is moved to the left until the position detector 12 senses the presence of the strip 9a, under the control of the control unit 18. The pickup operation of the photoelectric device 10 is commenced by a start signal from the operator through the console panel 17. In response to this start signal, the photoelectric device 10 is moved to the right by drivers 11 at a constant speed, and, at the same time, the photoelectric device 10 scans the information written on the board 1a and converts the optical image into a corresponding electrical signal. More specifically, and as illustrated in FIG. 7, the drivers 11 include a motor 11a having a motor shaft 11b capable of normal and reverse rotation and a rubber roller 11c fixed to the shaft 11b of the motor 11a, and the roller 11c contacts closely the surface of the board 1a so that the frictional force produced by the rotation of the roller causes the device 10 to move. As the device 10 is moved, it is provided with clock pulses of a predetermined period from the clock pulse generator 19. In synchronism with these clock pulses, each element (1, 2, . . . n) of the photoelectric device 10 is successively selected so that electrical signals corresponding to a linear optical image on the board along the length of the device 10 is supplied to the buffer memory 6 in series. It must be noted that, since the scanning by the photoelectric device 10 is executed during the motion thereof over the surface of the board 1a at a constant speed, the board is scanned in a fashion similar to that of scanning of a television receiver.

The electrical signals from the photoelectric device 10 are written into the buffer memory 6 bit-by-bit in succession, under the control of the memory control unit 20. The number of bits stored in each of columns of memory 6 corresponds to the number of elements in the photoelectric device 10, as shown in FIG. 6. Here, the space in the memory 6 is successively filled from the left to the right.

When the photoelectric device 10 has moved to the rightmost end and the position detector 12 senses the strip 9a, the device 10 is stopped there. At this time, if a demand for printing is given by the operator through the console panel 17, the control unit 18 supplies the printer 7 with a print-enable signal and makes the memory control unit 20 transfer the data stored in the memory 6 bit-by-bit to the printer 7. Thus, one or more copies of the information written on the board 1a are provided in the form of hardcopy, and the board is available for another communication.

The hardcopy of the next piece of information on the board can also be supplied as described except that the board is scanned by a motion of the photoelectric device 10 from the right to the left. Similarly, the memory is successively filled from the right to the left at this time.

It must now be noted that the board for writing information on need not necessarily be flexible because the photoelectric device is moved along the surface of the board at a predetermined spacing, and it is not necessary to wind or rewind the board.

Typical dimensions and characteristics of a specific embodiment of the invention are as follows:
(a) Size of board 1a: 800×100 to 12000 mm
(b) Size of hardcopy: A4 (210×297 mm)
(c) Resolution: 1 mm (approximately)
(d) Number of elements of photoelectric device 10: 800
(e) Speed of scanning: 5 to 8 m/sec
(f) Speed of photoelectric device 10: 9 cm/sec (approximately)

Finally, it should be noted that, while the image sensor in the preferred embodiment is shown to be constructed of CCD device, another type of CTD (Charge Transfer Device) such as BBD (Bucket Brigade Device) may be utilized. The color of the board is not limited to black, for example, white may be employed.

Having described a preferred embodiment of the invention, it will be apparent to those skilled in the art that other embodiments within the scope of the invention may be used. Accordingly, it is understood that the invention is to be limited only by the scope of the appended claims.

What is claimed is:
1. An electronic blackboard system comprising:

a rigid board means on which information can be written;

optical converter means disposed to face said rigid board means for picking up a linear portion of an optical image thereon and for converting said linear portion into a corresponding electrical signal, said optical converter means being elongated vertically;

means for moving said optical converter means in a direction perpendicular to said linear portion;

said means for moving comprising guide means fixed horizontally to the upper edge of the rigid board means and driver means for moving said optical converter means, said optical converter means being supported by the guide means, said driver means including a motor disposed at said optical converter means and roller means driven from said motor and contacting the surface of said rigid board means whereby the frictional force produced by rotation of the roller means causes the optical converter means to move, means for storing said converted electrical signal; and means for reading out the signal stored in said storing means and printing the contents thereof.

2. The electronic blackboard system of claim 1 wherein said printing means is capable of producing hardcopy.

3. The electronic blackboard system of claim 1 wherein said optical converter means comprises a one-dimensional CCD image sensor having a line of photoelectric elements.

4. The electronic blackboard system of claim 3 wherein said optical converter means further comprises light-emitting diodes disposed at the sides of said line of photoelectric elements for illustrating the surface of said rigid board means.

5. The electronic blackboard system of claim 1 wherein said driver means includes drivers disposed at both ends of said optical converter means.

6. An electronic blackboard system as set forth in claim 1 wherein said motor has a shaft to which the roller means is coupled.

7. An electronic blackboard system as set forth in claim 6 wherein said roller means comprises a rubber roller.

8. An electronic blackboard system as set forth in claim 1 wherein said means for storing comprises a data storage memory and said means for reading comprises a memory control unit and means for operator initiating a print-enable signal to transfer the data stored in the memory to a printer.

9. An electronic blackboard system as set forth in claim 8 wherein the print-enable signal is initiaed after the optical converter means has completed a scan and stored all data associated with the rigid board means.

10. An electronic blackboard system as set forth in claim 9 wherein said means for operator initiating comprises a control panel.

11. An electronic blackboard system comprising:

a rigid board means on which information can be written;

optical converter means disposed to face said rigid board means for picking up a linear portion of an optical image thereon and for converting said linear portion into a corresponding electrical signal, said optical converter means being elongated vertically;

means for moving said optical converter means in a direction perpendicular to said linear portion;

said means for moving comprising guide means fixed horizontally to the upper edge of the rigid board means and driver means on said optical converter means, contacting said rigid board means for moving said optical converter means along the surface of said rigid board means at a predetermined spacing therebetween, said optical converter means being supported by the guide means, means for storing said converted electrical signal; and means for reading out the signal stored in said storing means and printing the contents thereof.

12. An electronic blackboard system as set forth in claim 11 wherein said driver means includes a motor disposed at said optical converter means and roller means driven from said motor and contacting the surface of said rigid board means whereby frictional force produced by rotation of the roller means causes the optical converter means to move.

13. An electronic blackboard system as set forth in claim 12 wherein said means for storing comprises a data storage memory and said means for reading comprises a memory control unit and means for operator initiating a print-enable signal to transfer the data stored in the memory to a printer.

14. An electronic blackboard system as set forth in claim 13 wherein said guide means includes only a single guide at the top of the blackboard.

15. An electronic blackboard system comprising:

a rigid board means on which information can be written;

optical converter means disposed to face said rigid board means for picking up a linear portion of an optical image thereon and for converting said linear portion into a corresponding electrical signal, said optical converter means being elongated vertically;

means for moving said optical converter means in a direction perpendicular to said linear portion;

said means for moving comprising guide means fixed horizontally to the upper edge of the rigid board means and driver means on said optical converter means contacting said rigid board means for moving said optical converter means along the surface of said rigid board means at a predetermined spacing therebetween, said optical converter means being supported by the guide means, means for storing said converted electrical signal; and means for reading out the signal stored in said storing means and printing the contents thereof, said means for storing comprising a data storage memory and said means for reading comprising a memory control unit and means for operator initiating a print-enable signal to transfer the data stored in the memory to a printer.

16. An electronic blackboard system as set forth in claim 15 wherein said guide means includes only a single guide at the top of the blackboard.

* * * * *

UNITED STATES PATENT AND TRADEMARK OFFICE
CERTIFICATE OF CORRECTION

PATENT NO. : 4,858,021

DATED : August 15, 1989

INVENTOR(S) : Takehito Toyota

It is certified that error appears in the above-identified patent and that said Letters Patent is hereby corrected as shown below:

The term of this patent subsequent to July 5, 2005, has been disclaimed.

Signed and Sealed this

Twelfth Day of September, 1989

Attest:

DONALD J. QUIGG

Attesting Officer

Commissioner of Patents and Trademarks